United States Patent [19]

Shen et al.

[11] Patent Number: 5,030,528
[45] Date of Patent: Jul. 9, 1991

[54] MIXED SOLVENT ELECTROLYTES FOR AMBIENT TEMPERATURE SECONDARY LITHIUM CELLS

[75] Inventors: David H. Shen, Arcadia; Subbarao Surampudi, Glendora; Fotios Deligiannis, San Gabriel; Gerald Halpert, Pasadena, all of Calif.

[73] Assignee: The California Institute of Technology, Pasadena, Calif.

[21] Appl. No.: 520,265

[22] Filed: May 7, 1990

[51] Int. Cl.⁵ ............................................. H01M 6/16
[52] U.S. Cl. ..................................... 429/197; 429/218
[58] Field of Search ................ 429/197, 196, 194, 218

[56] References Cited

U.S. PATENT DOCUMENTS

| | | | |
|---|---|---|---|
| 4,489,145 | 12/1984 | Abraham et al. | 429/197 |
| 4,668,596 | 5/1987 | Shacklette et al. | 429/194 |
| 4,770,960 | 9/1988 | Nagaura et al. | 429/194 |
| 4,780,381 | 10/1988 | Shacklette et al. | 429/197 |
| 4,803,137 | 2/1989 | Miyazaki et al. | 429/194 |
| 4,814,242 | 3/1989 | Maxfield et al. | 429/217 |
| 4,851,309 | 7/1989 | Toyoguchi et al. | 429/194 |

OTHER PUBLICATIONS

Shen et al., Evaluation of Mixed Solvent Electrolytes for Ambient Temperature Secondary Lithium Cells, Proceedings of the Power Source Symposium, May 1988, Cherry Hill, N.J.

Primary Examiner—Anthony Skapars
Attorney, Agent, or Firm—Thomas N. Giaccherini

[57] ABSTRACT

The present invention comprises an improved electrolyte for secondary lithium-based cells as well as batteries fabricated using this electrolyte. The electrolyte is a lithium containing salt dissolved in a non-aqueous solvent, which is made from a mixture of ethylene carbonate, ethylene propylene diene terpolymer, 2-methylfuran, and 2-methyltetrahydrofuran. This improved, mixed solvent electrolyte is more conductive than prior electrolytes and much less corrosive to lithium anodes. Batteries constructed with this improved electrolyte utilize lithium or lithium alloy anodes and cathodes made of metal chalcogenides or oxides, such as $TiS_2$, $NbSe_3$, $V_6O_{13}$, $V_2O_5$, $MoS_2$, $MoS_3$, $CoO_2$, or $CrO_2$, dissolved in a supporting polymer matrix, like EPDM. The preferred non-aqueous solvent mixture comprises approximately 5 to 30 volume percent ethylene carbonate, approximately 0.01 to 0.1 weight percent ethylene propylene diene terpolymer, and approximately 0.2 to 2 percent 2-methylfuran, with the balance being 2-methyltetrahydrofuran. The most preferred solvent comprises approximately 10 to 20 volume percent ethylene carbonate, about 0.05 weight percent ethylene propylene diene terpolymer, and about 1.0 percent 2-methylfuran, with the balance being 2-methyltetrahydrofuran. The concentration of lithium arsenic hexafluoride can range from about 1.0 to 1.8 M; a concentration 1.5 M is most preferred. Secondary batteries made with the improved electrolyte of this invention have lower internal impedance, longer cycle life, higher energy density, low self-discharge, and longer shelf life.

16 Claims, 6 Drawing Sheets

MIXED SOLVENT ELECTROLYTES FOR AMBIENT TEMPERATURE SECONDARY LITHIUM CELLS

ORIGIN OF THE INVENTION

The invention described herein was made in the performance of work under a NASA contract, and is subject to the provisions of Public Law 96-517 (35 USC 202) in which the Contractor has elected to retain title.

TECHNICAL FIELD

This invention relates to a rechargeable electrochemical apparatus and more particularly to an improved mixed solvent electrolyte for such an apparatus.

BACKGROUND ART

Rechargeable batteries have been used for many years as portable sources of DC power. Commercially useful versions range from the well-known lead/acid batteries, which are commonly used to provide starting and ignition power for internal combustion engines, to the more modern nickel/cadmium (NICAD) batteries, which are currently used in power tools and household appliances, and to nickel/hydrogen (Ni/H$_2$) batteries, which are used in spacecraft.

All the above batteries, which contain aqueous electrolytes, have acceptable cycle lives but fairly limited energy densities. Specific energy is defined as the battery power in watts (W) multiplied by its life in hours (h) divided by its weight in kilograms (kg). Thirty Wh/kg is typical for lead/acid and NICAD batteries and fifty Wh/kg is typical for Ni/H$_2$ batteries. However, while lead/acid and NICAD batteries enjoy wide commercial acceptance, they contain toxic materials. Lead/acid batteries usually are reclaimed, but NICAD batteries are discarded, leading to environmental damage.

Figure 1:
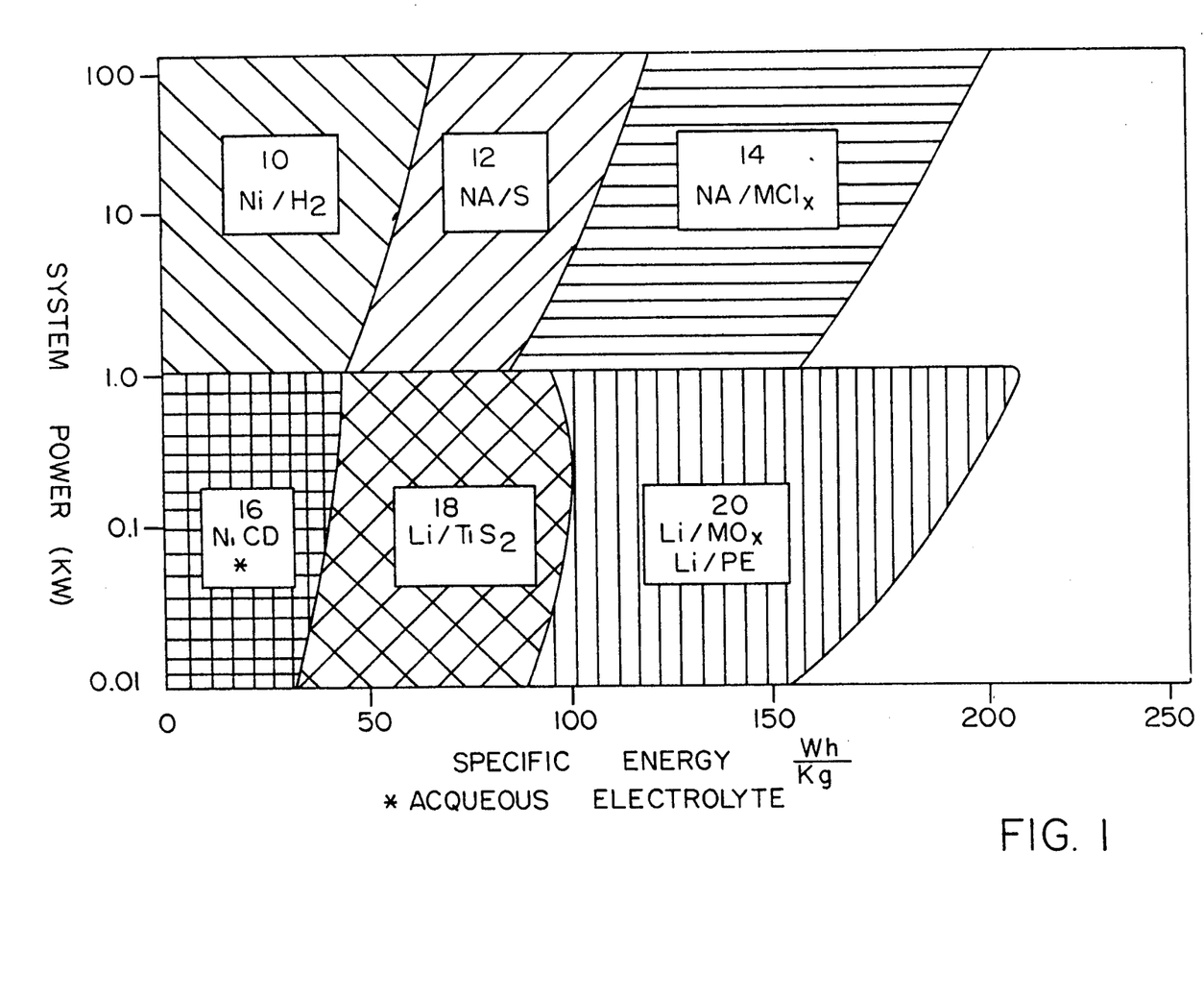
FIG. 1 shows performance envelopes for various secondary batteries.

Secondary batteries with non-aqueous electrolytes provide much higher specific energy, offering the potential for much reduced battery size or increased battery power. FIG. 1 is an illustration of the power and energy density ranges of several varieties of batteries. The area labeled 10 represents the range for Ni/H$_2$ batteries; 12 represents the range for sodium/sulfur batteries; 14 represents the range for sodium/metal chloride batteries; 16 represents the range for NICAD batteries; 18 represents the range for lithium/titanium disulfide batteries; and 20 represents the range for lithium/metal oxide and lithium/polyethylene batteries.

It can be seen from FIG. 1 that batteries based on lithium (Li) and sodium (Na), i.e. which have one electrode made of Li, Na, or a Li alloy, can provide from about 50 to 200 Wh/kg. Such batteries utilize organic, inorganic or molten salt electrolytes. Li batteries seem to be the most practical for commercial applications requiring low weight and volume.

However, to date, usage of Li-based secondary batteries with organic electrolytes has been fairly limited. This is mainly due to their poor cycle life and relatively low electrolyte conductivity. For example a currently available lithium/molybdenum (Li/Mo) battery, has an energy density of about 60 Wh/kg and a cycle life of around 200 charge/discharge cycles.

The lithium or lithium alloy electrode, in lithium secondary batteries, is called the anode in conventional battery terminology. Since lithium is a soft metal, it is usually press bonded to a supporting grid made of a more rigid metal, such as nickel. Since lithium readily reacts with moisture in the atmosphere, special dehumidified facilities are required for fabrication of anodes and batteries.

The other electrode, which is called the cathode in conventional battery terminology, is usually made of certain metal chalcogenides or oxides supported by a polymer matrix. Typical of these metal compounds are TiS$_2$, NbSe$_3$, V$_6$O$_{13}$, V$_2$O$_5$, MoS$_2$, MoS$_3$, CoO$_2$, and CrO$_2$. Ethylene propylene diene terpolymer is commonly used as the supporting polymer matrix.

Electrolytes used in such batteries are generally composed of some sort of lithium salt dissolved in a non-aqueous solvent. Many different salts have been used including LiClO$_4$, LiBF$_4$, LiAsF$_6$, and LiPF$_6$. Solvents have included propylene carbonate (PC), 1,3-dioxlane (DOL), tetrahydrofuran (THF), 2-methyltetrahydrofuran (2-MeTHF), 3-methylsulfolane (3-MeS), and methylformate.

One further component of all lithium-based secondary batteries is a separator, which is permeable to the electrolyte and which simply separates the anode and cathode to prevent shorting.

However, it has been found that all state-of-the-art electrolytes have a fairly low conductivity and react with the lithium anode to some degree. It is this reaction that reduces the useful cycle life of lithium secondary batteries. Some investigators have proposed complex ways of fabricating the anode or coating the anode with a protective coating to reduce this effect.

If an electrolyte could be found that had high conductivity but which were less corrosive to the lithium anode, it would satisfy a long felt need in the field of secondary battery technology since it would extend the useful life of the battery considerably. This would permit widespread use of lithium secondary batteries in such commercial and industrial applications as portable tools, appliances, cellular phones, computers, and in such space applications as the Mars Rover and the astronaut's backpack.

STATEMENT OF THE INVENTION

The present invention is directed towards an improved electrolyte which comprises a lithium containing salt dissolved in a special solvent mixture. The solvent mixture is comprised of ethylene carbonate (EC), ethylene propylene diene terpolymer (EPDM), 2-methylfuran (2-MeF), and 2-methyltetrahydrofuran (2-MeTHF). This improved, mixed solvent electrolyte is more conductive than prior electrolytes and much less corrosive to the anodes of lithium-based secondary batteries, thus improving their performance and extending their cycle life considerably.

The present invention also provides a secondary battery incorporating the improved electrolyte of this invention, which incorporates an anode; a cathode; and an electrolyte mixed from a lithium containing salt and a non-aqueous solvent comprising of a mixture of 2-methyltetrahydrofuran, ethylene carbonate, ethylene propylene diene terpolymer, and 2-methylfuran.

The most preferred embodiment of the secondary battery of this invention incorporates a lithium anode; a cathode comprising a mixture of ethylene propylene diene terpolymer and titanium disulfide; and an electrolyte comprising about 1.5M lithium arsenic hexafluoride (LiAsF$_6$) dissolved in a non-aqueous solvent mixed from approximately 10 to 20 volume percent ethylene carbonate, about 0.05 weight percent ethylene propylene diene terpolymer, about 1.0 volume percent 2-methylfuran, with the balance of the solvent being 2-methyltetrahydrofuran.

The most preferred embodiment of the secondary battery of this invention incorporates a lithium anode; a cathode comprising a mixture of ethylene propylene diene terpolymer and titanium disulfide; and an electrolyte comprising about 1.0 to about 1.8M lithium arsenic hexafluoride dissolved in a non-aqueous solvent mixed from approximately 5 to 30 volume percent ethylene carbonate, about 0.01 to about 0.1 weight percent ethylene propylene diene terpolymer, about 0.2 to about 2 volume percent 2-methylfuran, with the balance of the solvent being 2-methyltetrahydrofuran.

An appreciation of other aims and objectives of the present invention and a more complete understanding of it may be achieved by studying the following detailed description and referring to the accompanying drawings.

DETAILED DESCRIPTION OF THE INVENTION

Figure 2:
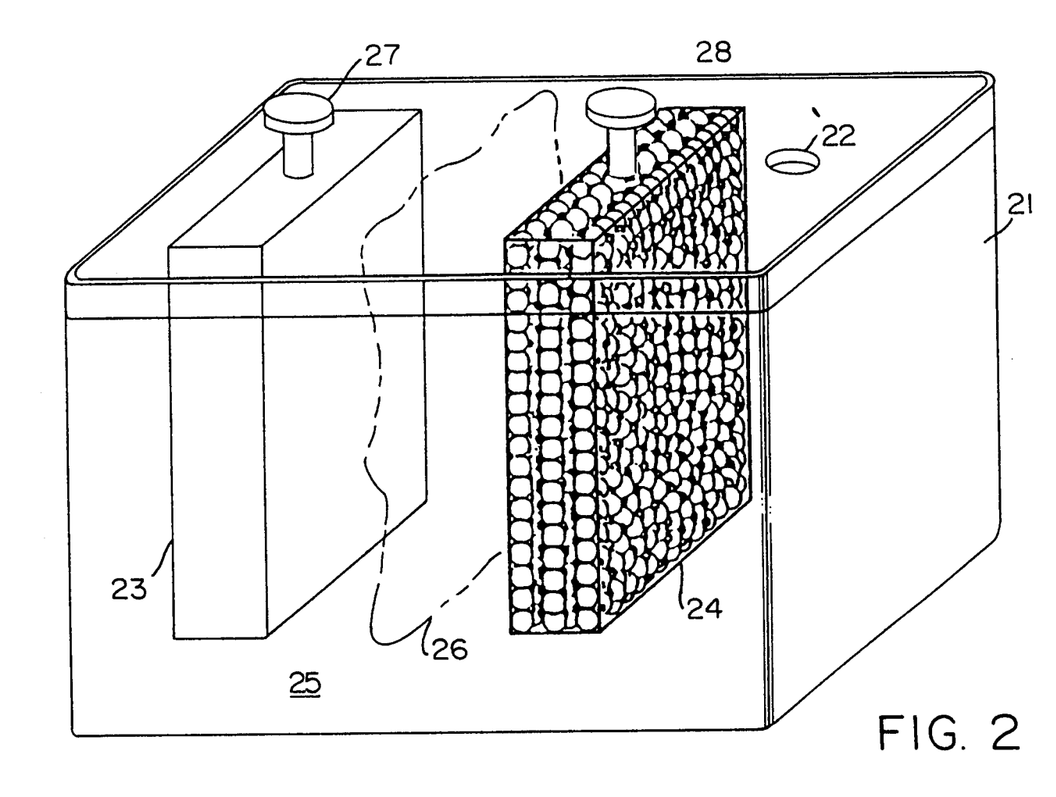
FIG. 2 is a schematic diagram of a typical Li-TiS$_2$ secondary battery showing the essential details of its construction.

Any suitable battery configuration such as a circular cylinder, a rectangular cylinder, or a button, can be used to practice this invention. For illustrative purposes, a rectangular configuration is shown in FIG. 2. In this configuration, the battery is contained in a housing 21 which has a sealed vent hole 22 in its upper surface. Spaced inside the housing are the Li anode 23 and the cathode 24, which are bathed in the electrolyte 25. Physical contact between the anode 23 and cathode 24 is prevented by the separator 26. Finally, attached to the anode 23 and cathode 24 and protruding through the top surface of the battery are the anodic battery post 27 and the cathodic battery post 28. These posts 27 and 28 are used to connect the battery to the desired electrical circuit.

Anodes 23 used to practice this invention are well known to individuals skilled in the art of secondary battery fabrication. While lithium alloys can be used, pure lithium is used in the preferred embodiment. Structural support is provided by press bonding the anode material to a nickel screen (not shown).

Cathodes 24 used to practice this invention are again well known to individuals skilled in the art of secondary battery fabrication. The cathodes can be made of a metal chalcogenide or oxide supported in a polymer matrix. Typical of these metal compounds are $TiS_2$, $NbSe_3$, $V_6O_{13}$, $V_2O_5$, $MoS_2$, $MoS_3$, $CoO_2$, and $CrO_2$. EPDM is commonly used as the supporting polymer matrix. The preferred cathode of this invention is made of $TiS_2$ supported in EPDM. This cathode is fabricated by the well known technique of making a slurry of powdered $TiS_2$ with a solution of EPDM in a suitable solvent, casting the slurry into a mold of the desired configuration, and allowing the solvent to evaporate.

The electrolyte 25 is prepared by mixing $LiAsF_6$ with the improved solvent mixture. The preferred concentration of $LiAsF_6$ is 1.5M but the concentration can range from about 1.0 to about 1.8M.

The improved, mixed solvent that has been identified comprises four components: 2-MeTHF, EC, EPDM and 2-MeF. The composition of this solvent can vary as shown in Table 1.

TABLE 1

| Ingredient | Most preferred concentration | Preferred concentration |
|---|---|---|
| EC | 10–20 vol. % | 5–30 vol % |
| EPDM | 0.05 wt. % | 0.01–0.1 wt. % |
| 2-MeF | 1.0 vol % | 0.2–2.0 vol. % |
| 2-MeTHF | balance | balance |

The separator 26 can be any material that is permeable to the electrolyte but which will prevent physical contact of the two electrodes. In the preferred embodiment, a microporous polypropylene separator is used.

In developing this improved mixed electrolyte, many test batteries were made and tested. The anodes, cathodes and configurations of the test batteries and the concentration of $LiAsF_6$ in the electrolyte were kept constant while the exact composition of the mixed solvent was varied. Testing methods included open-circuit stability, microcalorimetry, AC impedance and figure of merit, which was calculated by dividing the total capacity delivered by the Li electrode capacity.

Figure 4:
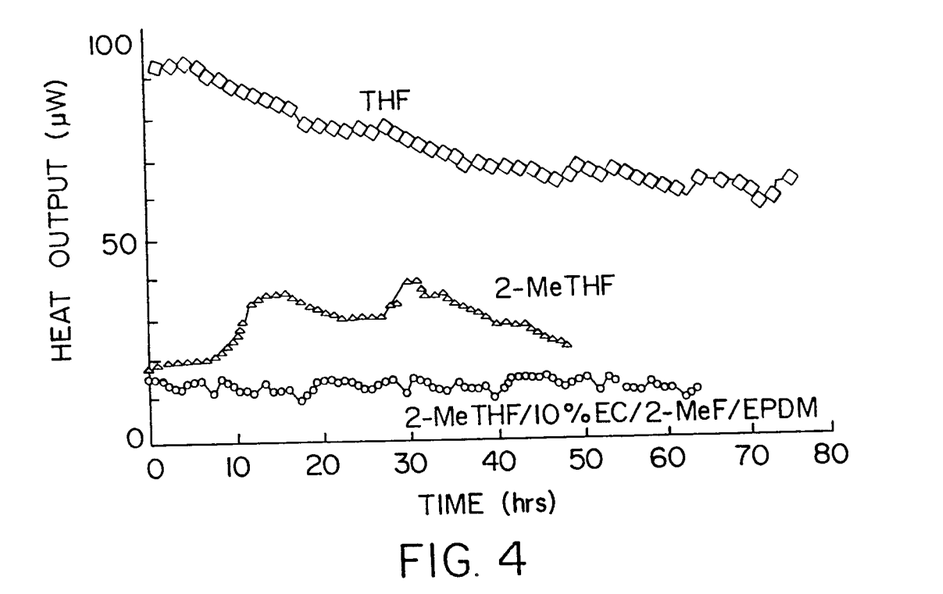
FIG. 4 is a graph comparing calorimetric studies of various test batteries.
Figure 5:
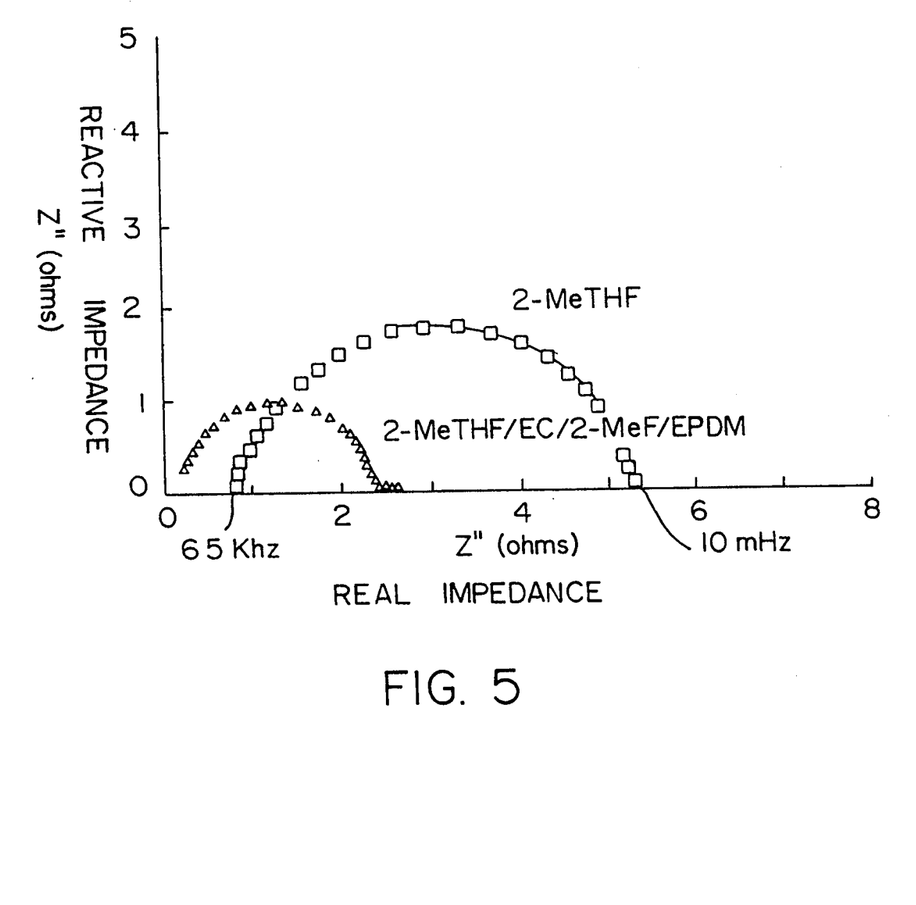
FIG. 5 shows impedance test results for various test batteries.

Test results are shown in the following tables and FIGS. 3 through 5.

TABLE 2

| | 30° C. | | 70° C. | |
|---|---|---|---|---|
| Composition | Li | Electrolyte | Li | Electrolyte |
| 1. THF | Dark brown | Brown ppt. | Dark brown | Brown ppt. |
| 2. 2-MeTHF | Shiny | Clear | Black stripe | Clear |
| 3. THF/2-MeTHF | Dark brown | Yellow | Brown | Yellow ppt. |
| 4. THF/EC | Brown spots | Clear | Brown spot | Brown |
| 5. THF/2-MeTHF/EC | Shiny | Clear | Brown spot | Light yellow |
| 6. 2-MeTHF/PC | Shiny | Clear | Shiny | Clear |
| 7. 2-MeTHF/EC/2-MeF/EPDM | Shiny | Clear | Shiny | Clear |

Table 2 shows clearly that electrolyte No. 7, comprising the basic ingredients of this invention, remained clear and did not discolor an immersed Li test panel.

This indicates that this electrolyte did not attack the Li.

TABLE 3

| Composition | Heat output (microwatts) | Figure of merit |
| --- | --- | --- |
| 1. THF | 90 | 3 |
| 2. 2-MeTHF | 25 | 28 |
| 3. THF/2-MeTHF | 80 | 6 |
| 4. THF/EC | 60 | 5 |
| 5. THF/2-MeTHF/EC | 27 | 8 |
| 6. 2-MeTHF/PC | 24 | 0 |
| 7. 2-MeTHF/EC/2-MeF/EPDM | 17 | 38 |

Table 3 shows that the an electrolyte comprising the basic ingredients of this invention, No. 7, had the lowest heat output and the highest figure of merit. The low heat output confirms that the electrolyte does not attack Li while a high figure of merit is indicative of high cycle life capability.

Figure 3:
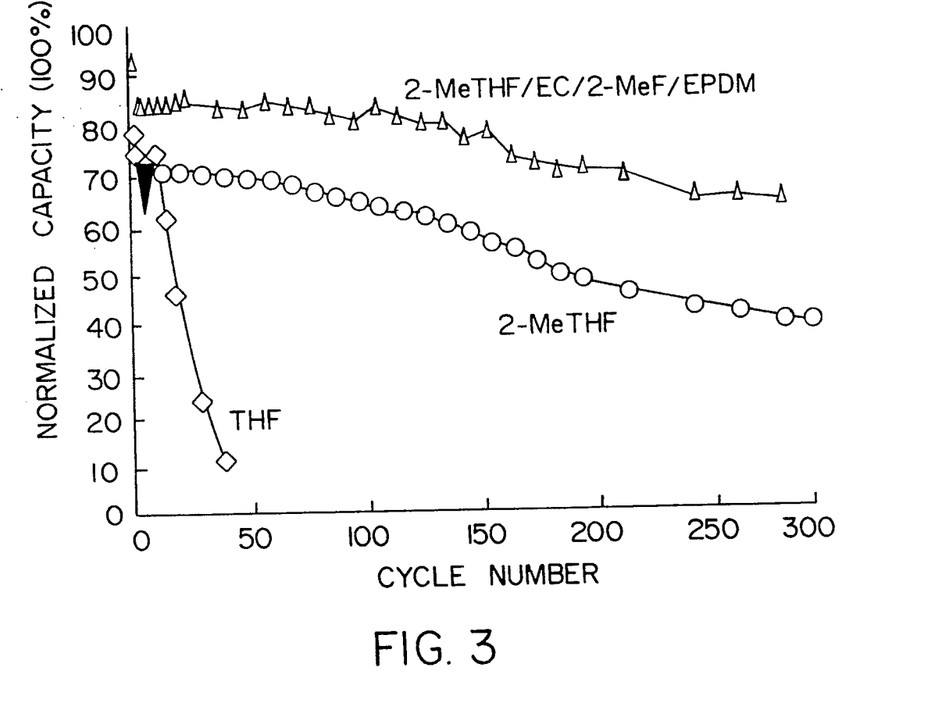
FIG. 3 is a graph comparing cycle life for various test batteries.

FIG. 3 demonstrates the long cycle life of this electrolyte. FIG. 4 and 5 show that the electrolyte has low heat output, corresponding to low self-discharge, and low impedance.

In operation, the $LiAsF_6$ in the electrolyte disassociates into $Li^+$ and $AsF_6^-$. It is these ions that carry the current in the cell, as shown in FIG. 2. Reactions at the anode can be represented by Equation One:

$$Li \leftrightarrow Li^+ + e^{31}. \qquad \text{Eq. 1}$$

At the cathode the Li is intercalated into the $TiS_2$ at discharge and deintercalated during charging. While this reaction can be represented in simplified form by Equation Two:

$$Li + TiS_2 \leftrightarrow Li\text{-}TiS_2, \qquad \text{Eq. 2}$$

Figure 6A:
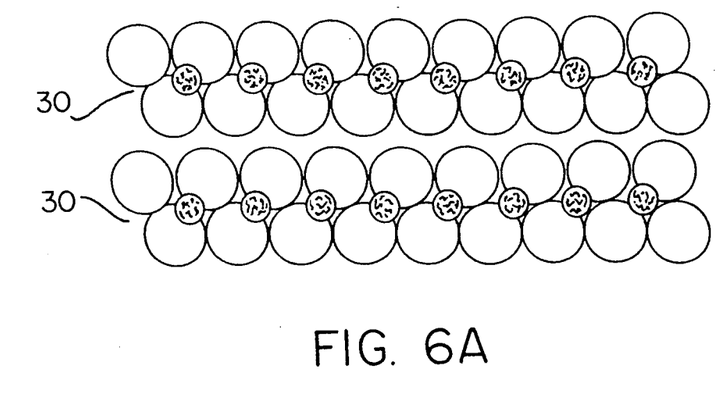
FIG. 6 shows the molecular structure of the TiS$_2$ electrode and the mechanism of Li intercalation.
Figure 6B:
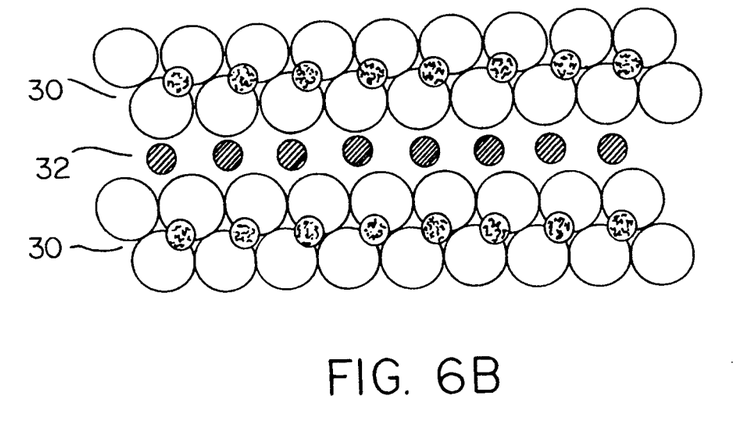

The process can be better understood by reviewing FIG. 6. FIG. 6(a) shows the crystal structure of the $TiS_2$ 30, while FIG. 6(b) shows how the Li atoms 32 are intercalated into the $TiS_2$ crystal structure 30.

These results suggest that secondary cells constructed with the improved electrolyte of this invention have lower internal impedance, longer cycle life, higher energy density, low self-discharge, and long shelf life.

The low impedance of the cells is due to the higher conductivity of this electroylte. The improved conductivity is achieved by the addition of EC. The longer cycle life and low self-discharge rate of the cell is due to the higher stability of the electrolyte towards lithium. The higher stability of this electrolyte appears to be due to the formation of a stable passivating film which is formed on the lithium anode surface. The stable passivating film results from the complex reaction taking place between the lithium and the EC, EPDM and 2-MeF in the electrolyte.

Figure 7A:
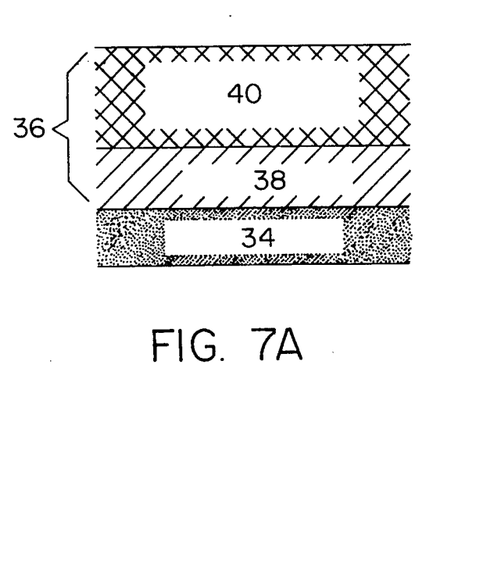
FIG. 7 shows the possible structure of the passivating film on the Li anode as well as an equivalent electrical model of the film.
Figure 7B:
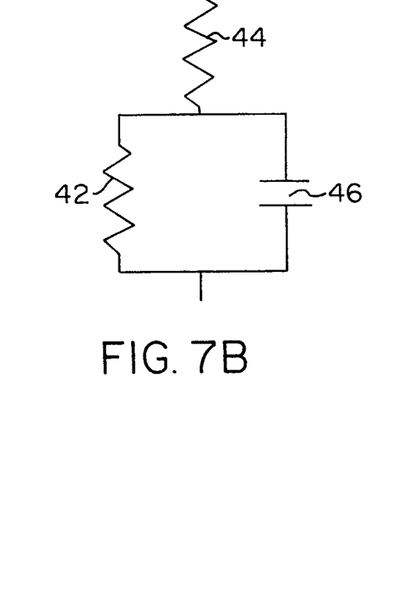
Figure 8:
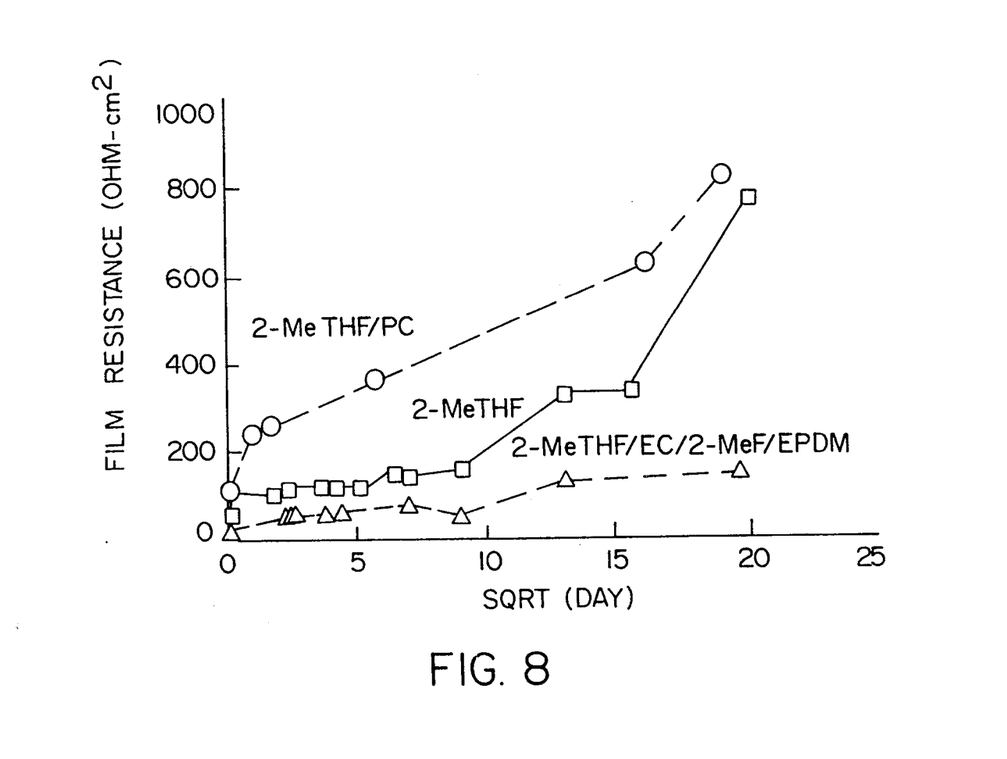
FIG. 8 shows the change in passivating film resistance with time for various test batteries.

A physical and electrical model of the structure of the passive film is shown in FIG. 7. FIG. 7(a) shows the Li anode 34 protected by a compact stratified or passive layer 36, which has a solid electolyte interface (SEI) layer 38 and a solid electrolyte interface/polymeric electrolyte interface (SEI/PEI) layer 40. The electrical properties of these layers can be represented by the schematic diagram shown at FIG. 7(b), in which 42 represents the resistance of the SEI layer 38, 44 represents the resistance of the SEI/PEI layer and 46 represents the geometric capacitance of the SEI layer 38. AC impedance measurements shown in FIG. 8 indicate that the charge transfer resistance does not increase significantly with time. This again suggests that this electrolyte exhibits higher stability towards lithium.

Although the present invention has been described in detail with reference to a particular preferred embodiment, persons possessing ordinary skill in the art to which this invention pertains will appreciate that various modifications and enhancements may be made without departing from the spirit and scope of the claims that follow.

LIST OF REFERENCE NUMERALS

10—Range of power vs. specific energy for $Ni/H_2$ batteries
12—Range of power vs. specific energy for sodium/sulfur batteries
14—Range of power vs. specific energy for lithium or aluminum/ferric sulfide and sodium/metal chloride batteries
16—Range of power vs. specific energy for NICAD batteries
18—Range of power vs. specific energy for lithium/titanium disulfide batteries
20—Range of power vs. specific energy for lithium/metal oxide and lithium/polyethylene batteries
21—Battery housing
22—Vent hole
23—Li anode
24—$TiS_2$/EPDM cathode
25—Electrolyte
26—Separator
27—Anodic battery post
28—Cathodic battery post
30—$TiS_2$ crystal layers
32—Li atoms
34—Li anode
36—Compact stratified layer
38—Solid electrolyte interface (SEI)
40—Solid electrolyte interface/polymeric electrolyte interface (SEI/PEI)
42—Resistance of SEI layer
44—Resistance of PEI layer
46—Capacitance of SEI layer

LIST OF ABBREVIATIONS

2-MeF—2-methylfuran
2-MeTHF—2-methyltetrahydrofuran
3-MeS—3-methylsulfolane
DOL—1,3-dioxlane
EC—ethylene carbonate
EPDM—ethylene propylene diene terpolymer
NICAD—nickel/cadmium
PC—propylene carbonate
PEI—polymeric electrolyte interface
SEI—solid electrolyte interface
THF—tetrahydrofuran

What is claimed is:

1. An electrolyte [25] for use in a rechargeable electrochemical apparatus comprising:
   (a) a non-aqueous solvent including a mixture of 2-methyltetrahydrofuran, ethylene carbonate, ethylene propylene diene terpolymer, and 2-methylfuran; and
   (b) a conductive solute.

2. An electrolyte [25] according to claim 1, wherein said conductive solute is a lithium salt.

3. An electrolyte [25] according to claim 2, wherein said lithium salt is lithium arsenic hexafluoride.

4. An electrolyte [25] according to claim 3, wherein said non-aqueous solvent comprises approximately 5 to 30 volume percent ethylene carbonate, approximately 0.01 to 0.1 weight percent ethylene propylene diene terpolymer, and approximately 0.2 to 2 percent 2-methylfuran, with said 2-methyltetrahydrofuran providing a balance of said non-aqueous solvent.

5. An electrolyte [25] according to claim 4, wherein said lithium arsenic hexafluoride is present in a concentration of about 1.0 to 1.8M.

6. An electrolyte [25] according to claim 3, wherein said non-aqueous solvent comprises approximately 10 to 20 volume percent ethylene carbonate, about 0.05 weight percent ethylene propylene diene terpolymer, and about 1.0 percent 2-methylfuran, with said 2-methyltetrahydrofuran providing a balance of said non-aqueous solvent.

7. An electrolyte [25] according to claim 6, wherein said lithium arsenic hexafluoride is present in a concentration of about 1.5M.

8. A rechargeable electrochemical cell comprising:
   (a) an anode [23];
   (b) a cathode [24]; and
   (c) an electrolyte [25] including:
      (i) a non-aqueous solvent mixture of 2-methyltetrahydrofuran, ethylene carbonate, ethylene propylene diene terpolymer, and 2-methylfuran; and
      (ii) a conductive solute.

9. A rechargeable electrochemical cell according to claim 8, wherein said anode [23] is selected from the group consisting of lithium, lithium-aluminum alloy and lithium-tin alloy.

10. A rechargeable electrochemical cell according to claim 9, wherein said cathode [24] comprises a mixture of ethylene propylene diene terpolymer and a compound selected from the group consisting of titanium disulfide, niobium triselenide, molybdenum disulfide, molybdenum trisulfide, cobalt dioxide, chromium dioxide, vanadium pentoxide, and $V_6O_{13}$.

11. A rechargeable electrochemical cell according to claim 10, wherein said conductive solute is a lithium salt.

12. A rechargeable electrochemical cell according to claim 11, wherein said lithium is lithium arsenic hexafluoride.

13. A rechargeable electrochemical cell according to claim 12, wherein said non-aqueous solvent mixture comprises approximately 5 to 30 volume percent ethylene carbonate, approximately 0.01 to 0.1 weight percent ethylene propylene diene terpolymer, and approximately 0.2 to 2 percent 2-methylfuran, with said 2-methyltetrahydrofuran providing a balance of said non-aqueous solvent mixture.

14. A rechargeable electrochemical cell according to claim 13, wherein said lithium arsenic hexafluoride is present in a concentration of from about 1.0 to about 1.8M.

15. A rechargeable electrochemical cell according to claim 12, wherein said non-aqueous solvent mixture comprises approximately 10 to 20 volume percent ethylene carbonate, about 0.05 weight percent ethylene propylene diene terpolymer, and about 1.0 percent 2-methylfuran, with said 2-methyltetrahydrofuran providing a balance of said non-aqueous solvent mixture.

16. A rechargeable electrochemical cell according to claim 15, wherein said lithium arsenic hexafluoride is present in a concentration of about 1.5M.

* * * * *